US009336426B2

(12) United States Patent
Aoki

(10) Patent No.: US 9,336,426 B2
(45) Date of Patent: May 10, 2016

(54) BIOMETRIC AUTHENTICATION DEVICE, BIOMETRIC AUTHENTICATION METHOD, AND COMPUTER READABLE, NON-TRANSITORY MEDIUM

(71) Applicant: FUJITSU LIMITED, Kawasaki-shi, Kanagawa (JP)

(72) Inventor: Takahiro Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/483,564

(22) Filed: Sep. 11, 2014

(65) Prior Publication Data
US 2014/0376784 A1   Dec. 25, 2014

Related U.S. Application Data

(63) Continuation of application No. PCT/JP2012/058180, filed on Mar. 28, 2012.

(51) Int. Cl.
*G06K 9/00* (2006.01)

(52) U.S. Cl.
CPC .......... *G06K 9/0004* (2013.01); *G06K 9/00013* (2013.01); *G06K 9/00523* (2013.01); *G06K 9/00926* (2013.01); *G06K 2009/0006* (2013.01)

(58) Field of Classification Search
CPC ............ G06K 9/0004; G06K 9/00046; G06K 9/00013; G06K 2009/00932; G06K 9/00; G06K 2009/0006; G06F 2203/0338
USPC .......................................................... 382/115
See application file for complete search history.

(56) References Cited

U.S. PATENT DOCUMENTS

| | | | | |
|---|---|---|---|---|
| 5,958,268 A | * | 9/1999 | Engelsberg | B08B 7/0042 134/1 |
| 6,414,749 B1 | * | 7/2002 | Okamoto | G06K 9/00046 356/71 |
| 2003/0086592 A1 | * | 5/2003 | Takiguchi | G06K 9/00 382/115 |
| 2003/0161510 A1 | * | 8/2003 | Fujii | G06K 9/00026 382/124 |
| 2004/0184641 A1 | | 9/2004 | Nagasaka et al. | |

(Continued)

FOREIGN PATENT DOCUMENTS

| | | |
|---|---|---|
| CN | 101038629(A) | 9/2007 |
| DE | 10332106 A1 | 9/2004 |

(Continued)

OTHER PUBLICATIONS

Tasdizen, Tolga; Jurrus, Elizabeth; Whitaker, Ross, "Non-Uniform Illumination Correction in Transmission Electron Microscopy", 2008.

(Continued)

*Primary Examiner* — Stephen R Koziol
*Assistant Examiner* — Shaghayegh Azima
(74) *Attorney, Agent, or Firm* — Staas & Halsey LLP

(57) ABSTRACT

A biometric authentication device includes: a memory configured to store an enrollment feature data; a biometric sensor that obtains a biometric image of a user; and a circuitry configured to: obtain a surface reflection degree of the biometric image; extract a comparison-use feature data from the biometric image; perform a comparing based on a similarity between the comparison-use feature data and the enrollment feature data; and reflect a correction coefficient and the surface reflection degree related to a region of the biometric image to the similarity.

9 Claims, 9 Drawing Sheets

(56) References Cited

U.S. PATENT DOCUMENTS

| | | | |
|---|---|---|---|
| 2004/0228508 A1* | 11/2004 | Shigeta | G06K 9/00026 382/124 |
| 2005/0100200 A1* | 5/2005 | Abiko | G06K 9/00026 382/124 |
| 2006/0247534 A1* | 11/2006 | Sato | A61B 5/117 600/476 |
| 2007/0217660 A1 | 9/2007 | Komura et al. | |
| 2007/0280513 A1* | 12/2007 | Engheta | A61B 5/1172 382/124 |
| 2008/0152195 A1* | 6/2008 | Nagasaka | G06K 9/00 382/115 |
| 2009/0018414 A1* | 1/2009 | Toofan | A61B 5/0059 600/310 |
| 2009/0036783 A1* | 2/2009 | Kishima | G06K 9/00013 600/476 |
| 2009/0243798 A1* | 10/2009 | Fukuda | G06K 9/00375 340/5.82 |
| 2010/0080422 A1 | 4/2010 | Sato | |
| 2011/0091113 A1 | 4/2011 | Ito et al. | |
| 2011/0188711 A1* | 8/2011 | Miura | A61B 5/02007 382/115 |
| 2012/0082348 A1* | 4/2012 | Fukuda | G06K 9/00375 382/115 |
| 2012/0106808 A1* | 5/2012 | Morioka | G06K 9/0008 382/125 |
| 2012/0154566 A1* | 6/2012 | Kaku | G02B 23/26 348/68 |
| 2012/0307031 A1* | 12/2012 | Aoki | G06K 9/00382 348/77 |
| 2013/0222346 A1* | 8/2013 | Chen | G06F 3/0425 345/175 |
| 2013/0308834 A1* | 11/2013 | Suzuki | G06K 9/00067 382/115 |
| 2014/0133711 A1* | 5/2014 | Abe | G06K 9/00067 382/115 |

FOREIGN PATENT DOCUMENTS

| | | |
|---|---|---|
| EP | 1894524 A1 | 3/2008 |
| EP | 2339534 A1 | 6/2011 |
| JP | 07-220075 | 8/1995 |
| JP | 2002-514098 | 5/2002 |
| JP | 2002-200050 | 7/2002 |
| JP | 2009-028427 | 2/2009 |
| JP | 2010-086241 | 4/2010 |
| JP | 2011-086265 | 4/2011 |
| WO | WO 98/08439 | 3/1998 |

OTHER PUBLICATIONS

International Search Report mailed Jun. 12, 2012 in corresponding International application PCT/JP2012/058180.

Extended European Search Report dated Apr. 14, 2015 in corresponding European Patent Application No. 12872839.1.

Chinese Office Action issued Mar. 11, 2016 in corresponding Chinese Application No. 201280071432.0.

* cited by examiner

FIG. 7A

| B₁ | B₂ | B₃ | B₄ |
|---|---|---|---|
| B₅ |  |  |  |
|  |  |  |  |
|  |  |  | B_N |

FIG. 7B

| ID | SMALL REGION | FEATURE DATA | RELI-ABILITY |
|---|---|---|---|
| 1 | $B_1$ | $F_1$ | $V_1$ |
|  | $B_2$ | $F_2$ | $V_2$ |
|  | ⋮ | ⋮ | ⋮ |
|  | $B_N$ | $F_N$ | $V_N$ |

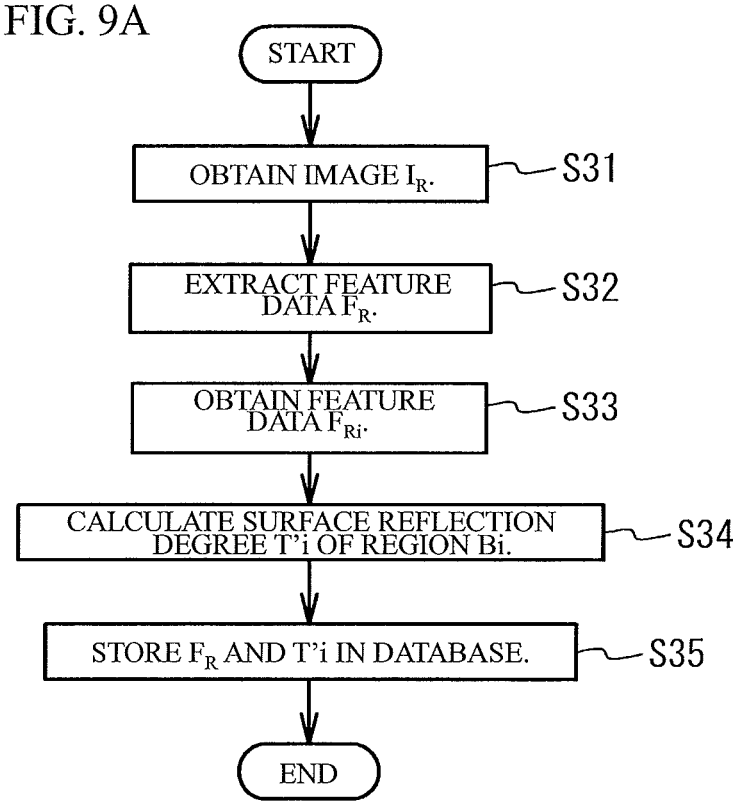

BIOMETRIC AUTHENTICATION DEVICE, BIOMETRIC AUTHENTICATION METHOD, AND COMPUTER READABLE, NON-TRANSITORY MEDIUM

CROSS-REFERENCE TO RELATED APPLICATION(S)

This application is a continuation application of International Application PCT/JP2012/058180 filed on Mar. 28, 2012 and designated the U.S., the entire contents of which are incorporated herein by reference.

FIELD

A certain aspect of the embodiments is related to a biometric authentication device, a biometric authentication method and a computer-readable, non-transitory medium.

BACKGROUND

There are known a method using a transmitted light, a method using a reflection light or the like as a method of taking an image of a biometric body in a biometric authentication. When an image of a biometric body under a skin such as a vein is taken, a diffusion light included in the reflection light diffusing inside of a palm and returning is used. In this case, a surface reflection light reflected at the skin becomes a noise. Therefore, when the surface reflection light and the diffusion light are overlapped, it is difficult to detect the biometric body.

There are known the following technologies as an imaging method for removing surface reflection. The surface reflection is removed with use of a polarization filter in Document 1. A surface reflection component is removed by an on-off controlling of a plurality of illuminations in Document 2.

PRIOR ART DOCUMENT

Patent Document

Patent Document 1: Japanese Laid-open Patent Publication No. 2002-200050
Patent Document 2: Japanese Laid-open Patent Publication No. 2002-514098

Non-Patent Document

Non-Patent Document 1: NON-UNIFORM ILLUMINATION CORRECTION IN TRANSMISSION ELECTRON MICROSCOPY

SUMMARY

According to an aspect of the present invention, there is provided a biometric authentication device including: a memory configured to store an enrollment feature data; a biometric sensor that obtains a biometric image of a user; and a circuitry configured to: obtain a surface reflection degree of the biometric image; extract a comparison-use feature data from the biometric image; perform a comparing based on a similarity between the comparison-use feature data and the enrollment feature data; and reflect a correction coefficient and the surface reflection degree related to a region of the biometric image to the similarity.

According to an aspect of the present invention, there is provided a biometric authentication method including: obtaining a surface reflection degree of a biometric image obtained by a biometric sensor; extracting a comparison-use feature data from the biometric image; and reflecting a correction coefficient and the surface reflection degree related to a region of the biometric image to a similarity between the comparison-use feature data and an enrollment feature data when performing a comparing based on the similarity.

According to an aspect of the present invention, there is provided a computer readable, non-transitory medium storing a program that causes a computer to execute a process, the process including: obtaining a surface reflection degree of a biometric image obtained by a biometric sensor; extracting a comparison-use feature data from the biometric image; and reflecting a correction coefficient and the surface reflection degree related to a region of the biometric image to a similarity between the comparison-use feature data and an enrollment feature data when performing a comparing based on the similarity.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7A illustrates a plurality of small regions Bi obtained by dividing;
FIG. 7B illustrates an example of enrollment data;
FIG. 9A illustrates an example of a flowchart executed during an enrollment process in accordance with a modified embodiment;
and
FIG. 9B illustrates an example of an enrollment data.

DESCRIPTION OF EMBODIMENTS

Figure 1:
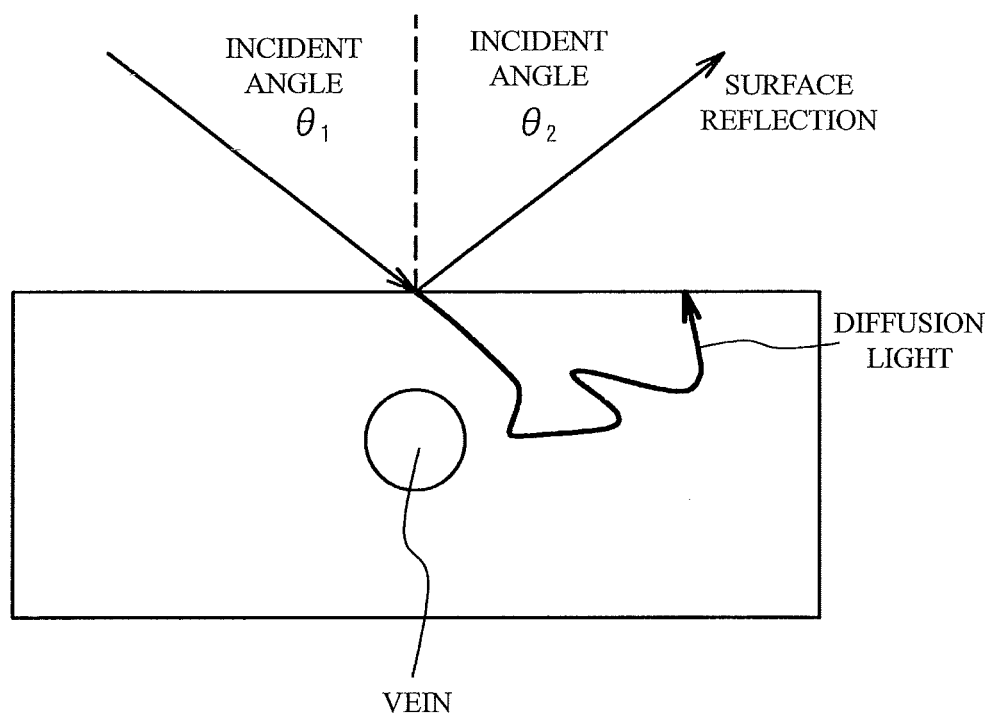
FIG. 1 illustrates surface reflection.

A description will be given of a biometric authentication using a reflection light before describing embodiments. As an example, a description will be given of a vein authentication. The vein authentication uses a method in which authentication is performed by taking an image of a vein under a skin with use of a near-infrared ray illumination. With reference to FIG. 1, a light radiated to a skin is divided into two reflection components of a diffusion light and a surface reflection light.

The diffusion light is a light having penetrated under a skin with diffusion. That is, the diffusion light is a light in which a light under a skin repeats scattering and finally reaches a skin surface. The diffusion light includes vein information under a skin and is an effective reflection light in the vein authentication.

The surface reflection light is a reflection light that occurs at a given ratio at an interface between air and a skin because of a difference between a refraction index of the air and a refraction index of the skin. A reflection direction and intensity of the surface reflection light is determined by an incident angle of a light and the refraction indices (air and a biometric body) (Snell's law and Fresnel's law). When a surface of a subject is flat, the surface reflection light is obtained only in a direction of a reflection angle ($\theta_2$) that is equal to an incident angle ($\theta_1$). However, when the surface of the subject is not flat as in the case of a biometric body, the surface reflection light is observed in a given range. The surface reflection light becomes a noise unneeded for a vein image.

Figure 2A:
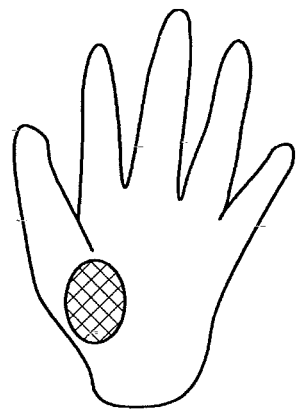
FIG. 2A to FIG. 2C illustrate surface reflection regions.
Figure 2B:
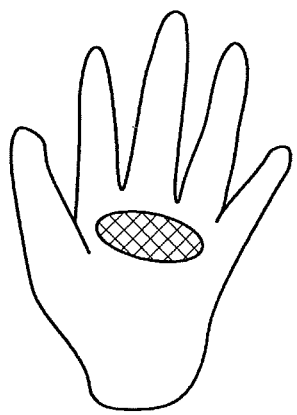
Figure 2C:
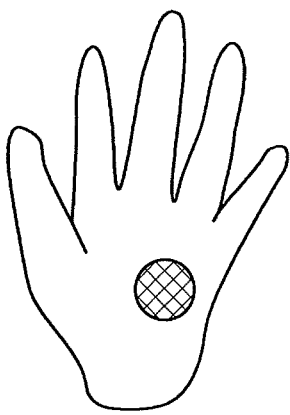

The reflection angle of the surface reflection depends on an incident angle with respect to the subject. Therefore, a region where a lot of surface reflection occurs (hereinafter referred to as a surface reflection region) may occur according to an incident condition of a light, as in the case of a subject having concave and convex portions such a as a palm. The surface reflection region is determined according to a distance of a subject, a position of the subject, an angle of the subject or the like. As illustrated in FIG. 2A to FIG. 2C, the surface reflection region may occur in various regions of a palm. In the examples of FIG. 2A to FIG. 2C, a shaded portion is the surface reflection region. It is difficult to take a sharp image in the surface reflection region. This is because a surface pattern (wrinkles, wounds or the like) overlaps with a vein. In this case, the authentication accuracy may be degraded.

The following technologies may be used as an imaging method for removing the surface reflection. For example, it is thought that the surface reflection is removed with use of a polarization filter. The polarization filter is a filter for dividing a light into a P wave and an S wave. When the polarization filter is used, the surface reflection can be removed with use of a reflectivity difference between the P wave and the S wave. However, there is a problem that the polarization filter is expensive. In particular, there are few polarization filters treating a near-infrared wavelength. Thereby, the polarization filters are more expensive. There may be a problem that a radiated light amount is generally reduced to less than a half because it is necessary to radiate a light through the polarization filter.

Figure 3:
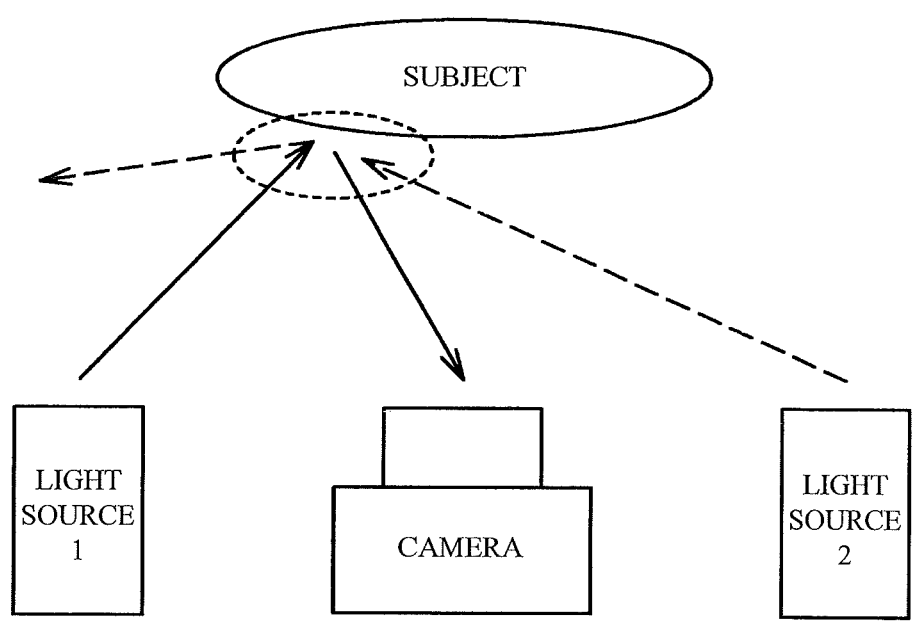
FIG. 3 illustrates a positional relation between a subject and light sources.

A reflection direction of the surface reflection is determined by an incident angle of a light. Therefore, when a plurality of illuminations are provided, a position of the surface reflection fluctuates according to the positions of the illuminations. And so, when an image is taken with on-off of the plurality of the illuminations being individually controlled, an image of which surface reflection component is removed can be generated. However, when the method is used, a device grows in size. That is, with reference to FIG. 3, when light sources are provided at a plurality of positions in order to make a difference between incident angles of the surface reflection, a given space is needed.

A description will be given of a biometric authentication device, a biometric authentication method and a biometric authentication program that are capable of suppressing a device size and a cost and improving authentication accuracy, with reference to drawings in the following embodiments.

First Embodiment

Figure 4A:
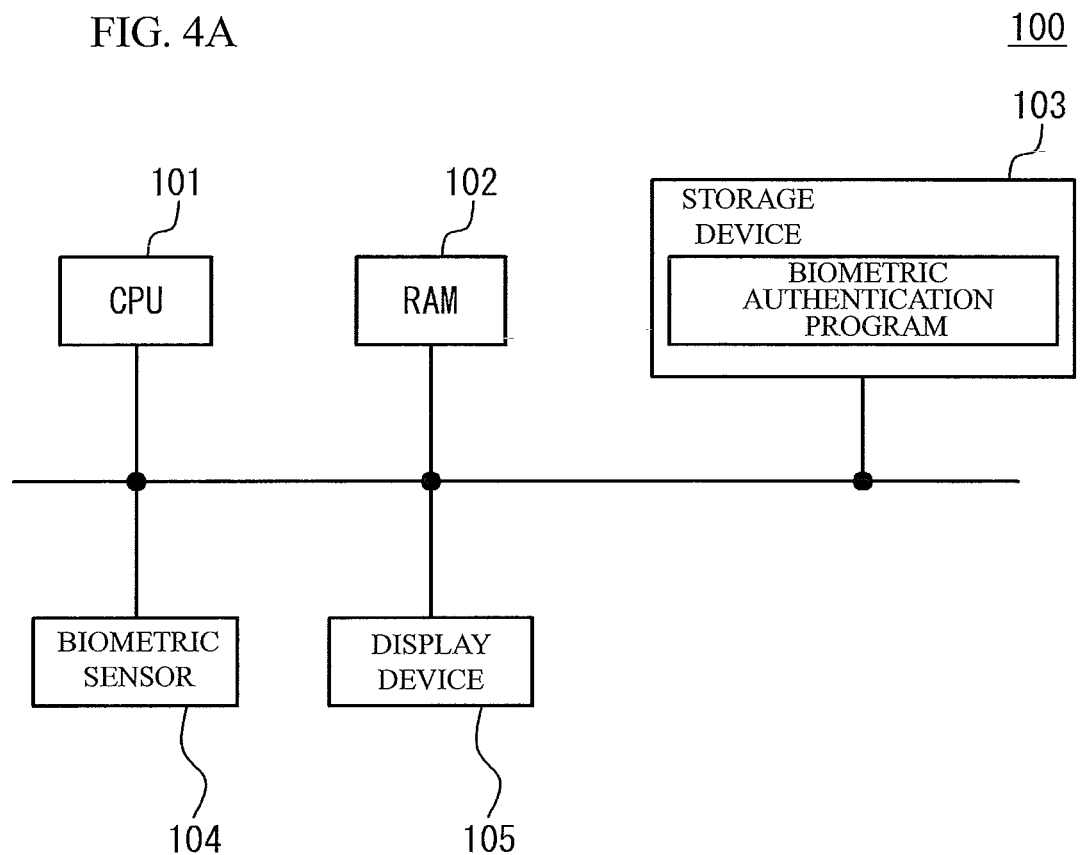
FIG. 4A illustrates a block diagram for describing a hardware structure of a biometric authentication device in accordance with a first embodiment.

FIG. 4A illustrates a block diagram for describing a hardware structure of a biometric authentication device 100 in accordance with a first embodiment. With reference to FIG. 4A, the biometric authentication device 100 has a CPU 101, a RAM 102, a storage device 103, a biometric sensor 104, a display device 105 and so on. These components are coupled with each other via a bus or the like.

The CPU (Central Processing Unit) 101 is a central processing unit. The CPU 101 includes one or more core. The RAM (Random Access Memory) 102 is a volatile memory temporally storing a program executed by the CPU 101, a data processed by the CPU 101, and so on.

The storage device 103 is a nonvolatile memory device. The storage device 103 may be an SSD (Solid State Drive) such as a ROM (Read Only Memory) or a flash memory, or a hard disk driven by a hard disk drive. A biometric authentication program is stored in the storage device 103. The display device 105 is a device for showing a result of each process of the biometric authentication device 100. The display device 105 is a liquid crystal display or the like.

The biometric sensor 104 is a sensor to obtain a biometric image of a user with use of a reflection light, and obtains vein information of a finger, a palm or the like of the user. As an example, the biometric sensor 104 is an imaging device to take a vein image under a skin of the palm with use of a near-infrared ray having high permeability with respect to a human body. For example, the biometric sensor 104 has a CMOS (Complementary Metal Oxide Semiconductor) camera or the like. An illumination radiating a light including a near-infrared ray may be provided. The biometric sensor 104 may have a distance sensor to obtain a distance between the biometric sensor 104 and the biometric body and an inclination of the biometric body. In the embodiment, the biometric sensor 104 obtains vein information by taking an image of a palm as an example.

Figure 4B:
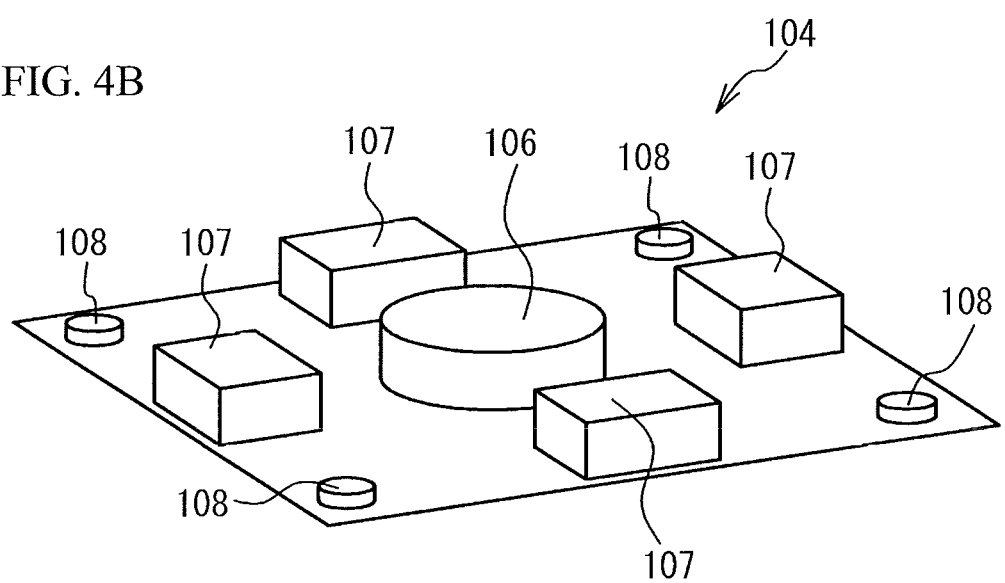
FIG. 4B illustrates a perspective view of a biometric sensor.

FIG. 4B illustrates a perspective view of the biometric sensor 104. With reference to FIG. 4B, the biometric sensor 104 has an imaging device 106, a light radiation device 107, and a distance sensor 108. The imaging device 106 is not limited when the imaging device 106 is capable of obtaining a vein image. The light radiation device 107 is not limited when the light radiation device 107 is capable of radiating a light including a near-infrared ray. The number of the light radiation device 107 may be one or more. In FIG. 4B, four light radiation devices 107 surrounds the imaging device 106. The distance sensor 108 is not limited when the distance sensor 108 is capable of obtaining a distance to a subject. The number of the distance sensor 108 may be one or more. In the example of FIG. 4B, the distance sensors 108 are located between each of the light radiation devices 107.

A description will be given of each process of the biometric authentication device 100. The biometric authentication program stored in the storage device 103 of the biometric authentication device 100 is developed to the RAM 102 so as to be executed. The CPU 101 executes the biometric authentication program developed to the RAM 102. Thus, each process is performed by the biometric authentication device 100.

Figure 5:
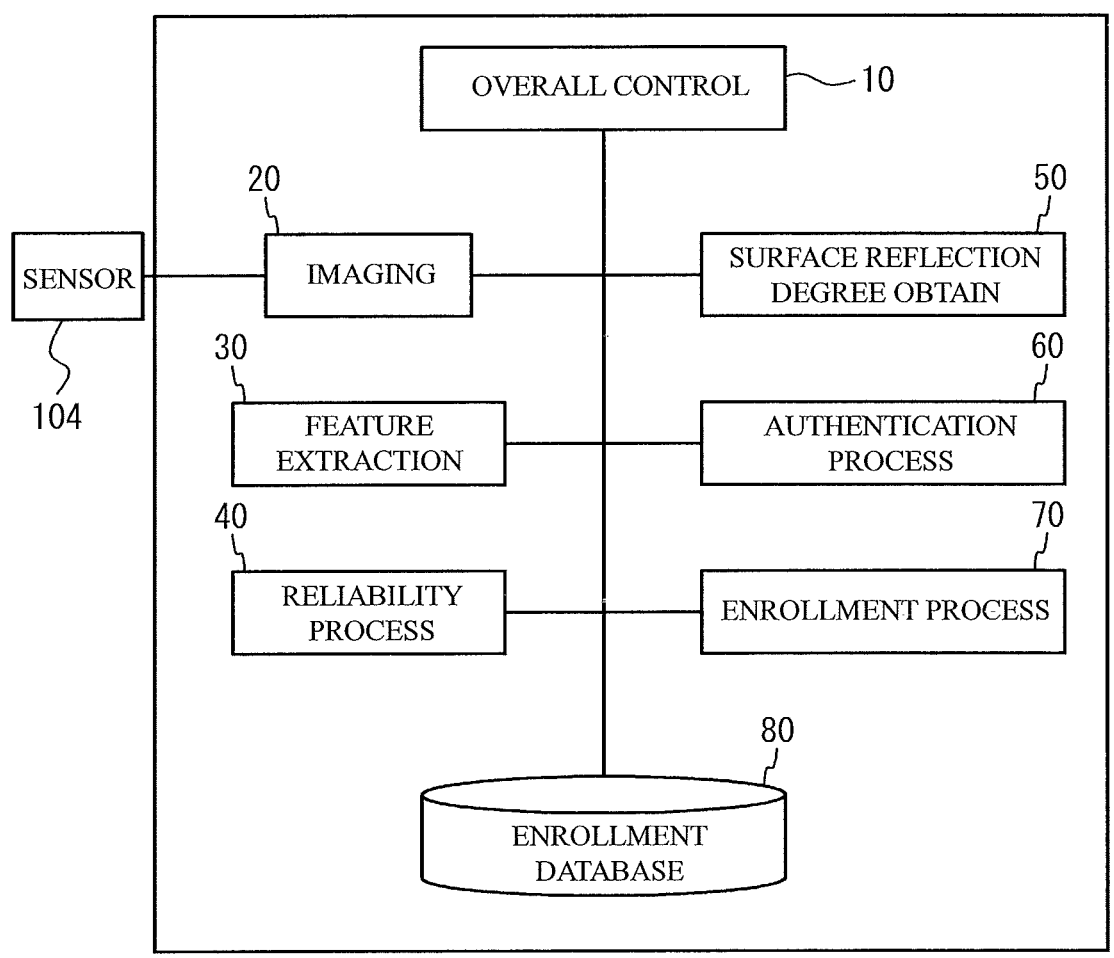
FIG. 5 illustrates a block diagram of each function realized by execution of a biometric authentication program.

FIG. 5 illustrates a block diagram of each function realized by the execution of the biometric authentication program. With reference to FIG. 5, an overall control unit 10, an imaging unit 20, a feature extraction unit 30, a reliability process unit 40, a surface reflection degree obtain unit 50, an authentication process unit 60 and a enrollment process unit 70 are realized by the execution of the biometric authentication program. An enrollment database 80 is stored in the storage device 103.

The overall control unit 10 controls the imaging unit 20, the feature extraction unit 30, the reliability process unit 40, the surface reflection degree obtain unit 50, the authentication process unit 60 and the enrollment process unit 70. The imaging unit 20 obtains a palm vein from the biometric sensor 104 as a biometric image in accordance with an instruction of the overall control unit 10. When the biometric sensor 104 is connected via an USB or the like, the imaging unit 20 receives an encrypted biometric image from the biometric sensor 104 and decrypt the encrypted biometric image in order to prevent leakage of a feature data.

The feature extraction unit 30 extracts a feature data from the biometric image obtained by the imaging unit 20. The feature data is a data indicating a biometric feature and is a palm vein pattern in the embodiment. The reliability process unit 40 performs a process for setting a reliability of a biometric region, a process for updating a reliability of the biometric region or the like. The surface reflection degree obtain unit 50 detects a surface reflection component of the palm image obtained by the biometric sensor 104 and calculates a surface reflection degree (degree of existence of surface reflection). The authentication process unit 60 performs an authentication process in accordance with an instruction of the overall control unit 10.

The enrollment process unit 70 enrolls a feature data extracted by the feature extraction unit 30 and the reliability set by the reliability process unit 40 in the enrollment database 80 as an enrollment data during the enrollment process. In the following description, a feature data enrolled in the enrollment database 80 is referred to as an enrollment feature data. In the authentication process, the authentication process unit 60 compares a comparison-use feature data extracted by the feature extraction unit 30 with an enrollment feature data enrolled by the enrollment database 80. The authentication process unit 60 uses a reliability of the enrollment feature data and a surface reflection degree obtained by the surface reflection degree obtain unit 50. A description will be given of details of the enrollment process and an authentication process.

Figure 6:
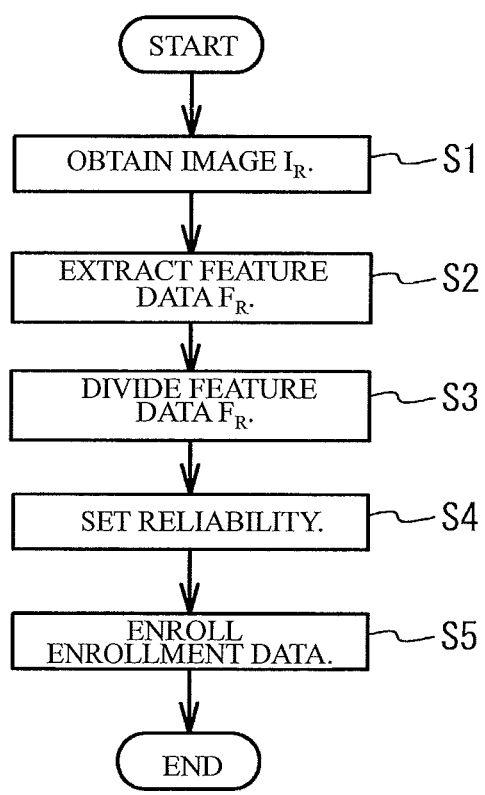
FIG. 6 illustrates an example of a flowchart during an enrollment process.

(Enrollment Process) FIG. 6 illustrates an example of a flowchart executed during the enrollment process. A description will be given of an example of the enrollment process with reference to FIG. 6. The imaging unit 20 obtains a palm image $I_R$ taken by the biometric sensor 104 (Step S1). During the taking of an image, imaging conditions may be set to a subject. In concrete, when a distance to the subject, a position of the subject, an inclination of the subject and so on are within a predetermined range, the image may be taken. The distance to the subject can be measured with use of the distance sensor 108. The position of the subject can be measured with use of the obtained image. The inclination of the subject can be measured with use of a plurality of the distance sensors 108.

The imaging unit 20 detects a palm region from the palm image $I_R$ obtained by the biometric sensor 104. In concrete, the imaging unit 20 cuts out the palm region by binarizing luminance values of the taken palm image $I_R$ with a threshold. In this case, the luminance values may be normalized in order to improve unevenness of the illumination. When the normalization is performed, it is possible to check overlapping of surface reflection regions of a plurality of different images easily.

Next, the imaging unit 20 extracts a feature data $F_R$ of the palm region (Step S2). Next, the imaging unit 20 divides the feature data $F_R$ according to small regions $B_i$ (i=1, 2, to N) that are obtained by dividing the detected palm region (Step S3). FIG. 7A illustrates the plurality of the small regions $B_i$ obtained by the division. A feature data corresponding to the small region $B_i$ is referred to as a feature data $F_{Ri}$. That is, the small region $B_1$ corresponds to a feature data $F_{R1}$, and the small region $B_2$ corresponds to a feature data $F_{R2}$.

Next, the reliability process unit 40 relates a reliability $V_i$ ("i" corresponds to "i" of small region $B_i$) to a small region $B_i$ (Step S4). The reliability is a correction coefficient related to the small region $B_i$. In the embodiment, the reliability is an index indicating high or low of authentication reliability of the small region $B_i$. Therefore, the reliability process unit 40 acts as a correction coefficient process unit. In concrete, the reliability $V_i$ is a coefficient (0 to 1) indicating a reliability of the authentication of each small region. The higher the reliability $V_i$ is, the higher the reliability of the small region $B_i$ is. For example, in a case of a palm vein authentication, there are a region of which authentication accuracy is relatively high and a region of which authentication accuracy is relatively low, because of distribution shape of veins or the like. During the enrollment process, each reliability $V_i$ may have an identical value (for example, "1"). Each reliability $V_i$ may have a different value. A similarity of a first authentication process may be used as a deduced value of the reliability without setting a reliability during the enrollment process. In the embodiment, a description will be given of an example in which a reliability is set during the enrollment process.

The enrollment process unit 70 relates a feature data $F_{Ri}$ and a reliability $V_i$ to a small region $B_i$, and enrolls the small region $B_i$, the feature data $F_{Ri}$ and the reliability $V_i$ in the enrollment database 80 as an enrollment data (Step S5). FIG. 7B illustrates an example of an enrollment data. "ID" is information that uniquely indicates an enrolled user. After the Step S5, the flowchart of FIG. 6 is terminated.

Figure 8:
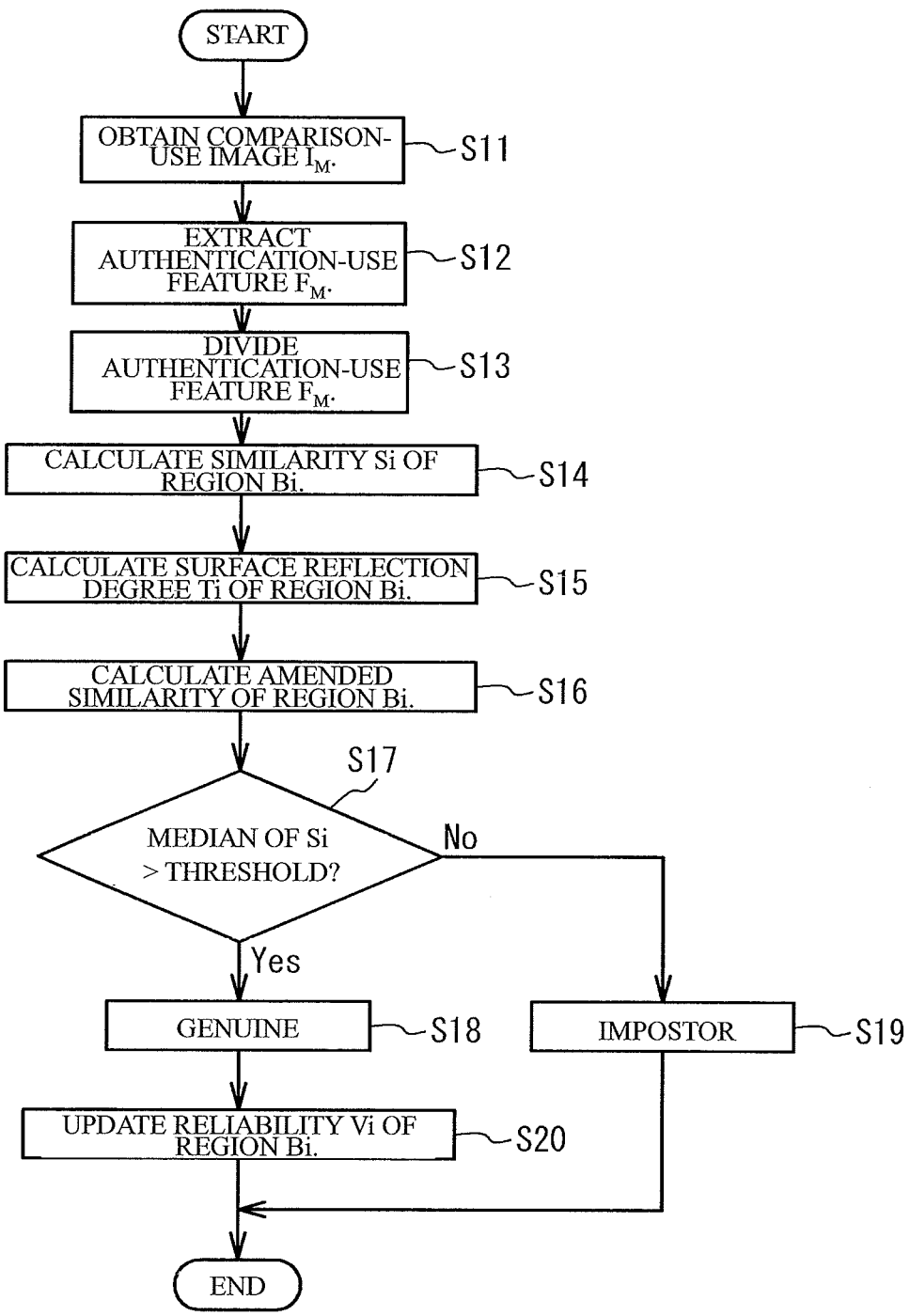
FIG. 8 illustrates an example of a flowchart executed during an authentication process.

(Authentication Process) FIG. 8 illustrates an example of a flowchart executed during the authentication process. The authentication process is performed during a BIOS authentication, a log-on authentication or the like at a starting of a PC. First, the imaging unit 20 obtains a comparison-use image $I_M$ for authentication taken by the biometric sensor 104 (Step S11). Next, the imaging unit 20 extracts a feature data $F_M$ for authentication from the comparison-use image $I_M$ (Step S12).

Next, the imaging unit 20 divides the feature data $F_M$ according to the small region $B_i$ (Step S13). Next, the authentication process unit 60 calculates a similarity $S_i$ between the comparison-use feature data $F_{Mi}$ and an enrollment feature data $F_{Ri}$ enrolled in the enrollment database with respect to each small region $B_i$ (Step S14). A correlation coefficient between images, L1 norm and so on may be used as the calculation of the similarity. A difference degree is included in the same concept as the similarity in a point that the difference degree has a characteristic opposite to the similarity.

Next, the surface reflection degree obtain unit 50 obtains a surface reflection degree $T_i$ in the comparison-use image $I_M$ with respect to each small region $B_i$ (Step S15). The surface reflection degree is an index indicating existence ratio of the surface reflection. In a region where a surface reflection occurs, a luminance value gets higher. In the region where the surface reflection occurs, many high frequency components are included because of influence of surface wrinkles or the like. And so, the surface reflection degree may be obtained by detecting at least one of the luminance value and the high frequency component.

For example, the surface reflection degree obtain unit 50 obtains an index of the surface reflection degree in accordance with the following formula (1). In the Formula (1), "$I_i$" indicates an average luminance value of the small region $B_i$. "$F_i$" indicates a ratio of the high frequency component included in the small region Bi. "$\alpha_0$" and "$\alpha_1$" are coefficients. Next, the surface reflection degree obtain unit 50 obtains a surface reflection degree $T_i$ by normalizing the index calculated by the formula (1) in accordance with the following formula (2). When the formula (2) is used, the surface reflection degree $T_i$ is normalized into a value of 0 to 1. The surface reflection degree $T_i$ is a coefficient indicating influence of surface reflection. Therefore, the smaller the surface reflection degree $T_i$ is, the more preferable the small region $B_i$ is.

[Formula 1]

$$\tilde{T}_i = \alpha_0 I_i + \alpha_1 F_i \quad (1)$$

[Formula 2]

$$T_i = \frac{\tilde{T}_i}{\langle \tilde{T}_i \rangle_{max}} \quad (2)$$

The surface reflection degree $T_i$ may be calculated by correlating luminance values of whole of the palm. In this method, the luminance values of the whole of the palm may be fitted to a smooth shape such as a spline curve or the like, and a region that is out of a fitting curve may be determined as a region of which surface reflection is high. The fitting method is not limited. For example, a method disclosed in non-Patent Document 1 may be used. In concrete, a difference between a luminance value $G_i$ of a center position of the small region $B_i$ and a luminance value $H_i$ at a coordinate calculated by the fitting as the index of the surface reflection degree in accordance with the following formula (3) when the small region $B_i$ is noticed. It is possible to obtain the surface reflection degree $T_i$ from the index in accordance with the formula (2). When $(G_i-H_i)$ is minus, the surface reflection degree $T_i$ may be determined as "0.0".

[Formula 3]

$$\tilde{T}_i = G_i - H_i \quad (3)$$

Next, the authentication process unit 60 corrects the similarity $S_i$ with use of the reliability $V_i$ and the surface reflection degree $T_i$ (Step S16). The authentication process unit 60 reduces the similarity, the lower the reliability is, and reduces the similarity, the higher the surface reflection degree is. And, the authentication process unit 60 increases the similarity, the higher the reliability is, and increases the similarity, the lower the surface reflection degree is. That is, the corrected similarity is a value to which the reliability and the influence of the surface reflection of the small region are reflected. Therefore, the authentication accuracy may be improved more than a case where a similarity between small regions are simply compared. As an example, the authentication process unit 60 calculates a similarity $S_i'$ by correcting the similarity $S_i$ in accordance with the following formula (4).

[Formula 4]

$$S_i' = S_i \cdot (1.0 - T_i) \cdot V_i \quad (4)$$

Next, with use of the corrected similarity $S_i'$, the authentication process unit 60 determines whether a subject is genuine. For example, the authentication process unit 60 obtains a median value of the corrected similarity $S_i'$ as a final similarity $S_{Total}=\mathrm{Med}(S_i)$ with respect to each enrolled user, and determines whether the similarity $S_{Total}$ is larger than a threshold (Step S17). Med( ) is a function giving a median value (center value). In this manner, when the comparison is performed per a small region, a correct authentication is allowed even if whole palms do not coincide with each other. When the median value of similarities of regions is obtained, influence of a block of which similarity is too high or a block of which similarity is too low is suppressed and a stable authentication can be achieved. In the above-mentioned example, the median value is used. However, another statistic amount may be used as the index.

When there is an enrolled user allowing "Yes" determination in the Step S17, the authentication process unit 60 determines that a user to be authenticated is the enrolled user (Step S18). When it is determined as "No" in the Step S17, the authentication process unit 60 determines that the user to be authenticated is not included in the enrolled users (impostor) (Step S19).

After the Step S18, the reliability process unit 40 updates the reliability $V_i$ based on the authentication result (Step S20). For example, the reliability process unit 40 updates the reliability $V_i$ so that the higher the similarity is, the higher the reliability is. In concrete, the reliability process unit 40 calculates an index of the reliability in accordance with the following formula (5). "$\alpha$" is a coefficient for normalizing the similarity $S_i$ into a value within a range 0.0 to 1.0. That is, the similarity $S_i$ may be variable according to a calculation method. For example, when a correlation coefficient is used, the similarity may be within the range 0.0 to 1.0. However, when a distance is used, the similarity may be larger than the range. The "$\alpha$" is a normalization coefficient for treating these parameters uniformly. The higher the similarity of the block is, the higher the index of the following formula (5) is. That is, it is thought that a region of which similarity is high in a case where a subject is genuine has high reliability. The index of the following formula (5) is the reliability of the authentication process. The reliability process unit 40 calculates an updated reliability $V_i'$ that is updated from the reliability $V_i$ of the small region $B_i$ with use of the value in accordance with the following formula (6).

[Formula 5]

$$\tilde{V}_i = \alpha \cdot S_i \quad (5)$$

[Formula 6]

$$V_i' = (1.0 - w) V_i + w \tilde{V}_i \quad (6)$$

In the above formula (6), the "w" is an update-use weight (0.0 to 1.0). Therefore, in accordance with the above formula (6), the reliability $V_i$ is gradually updated with use of the weight w for determining a speed of the updating based on a current reliability $V_i$. The surface reflection degree $T_i$ may be used as in the case of the following formula (7) when setting the update-use weight w. In the formula (7), "$w_0$" is a constant indicating an overall speed for updating. When the surface reflection degree $T_i$ is reflected to the update-use weight w, a weight for updating of a region having a lot of surface reflection may be reduced. In reverse, when the surface reflection degree $T_i$ is small, the similarity $S_i$ of the small region $B_i$ is reliable. It is therefore enlarge the update-use weight w. As a result, accuracy for updating the reliability $V_i$ can be improved.

[Formula 7]

$$w = w_0 (1.0 - T_i) \quad (7)$$

After the Step 20 or the Step S19, the flowchart of FIG. 7 is terminated.

In the embodiment, both a correction coefficient and a surface reflection degree related to each region of a biometric image can be reflected to a similarity between an enrollment feature data and a comparison-use feature data. In this case, even if a large-size device or an expensive device is not used, authentication accuracy can be improved. That is, it is possible to suppress a device size and a cost and improve the authentication accuracy. For example, when only one of the correction coefficient and the surface reflection degree is reflected, there may be a case where it is determined that a subject is genuine based on a comparison result of a region of which importance and reliability for authentication are low with less surface reflection. Alternately, there may be a case where an erroneous authentication is performed when there are a lot of surface reflection even if the reliability of the region for authentication is high. In contrast, in the embodiment, the authentication accuracy can be improved by reflecting both the correction coefficient and the surface reflection degree related to each region of the biometric image to the similarity between the enrollment feature data and the comparison-use feature data. Here, the reliability $V_i$ is a value unique to each user. On the other hand, the surface reflection degree $T_i$ is a value obtained during the authentication process. When the reliability $V_i$ and the surface reflection degree $T_i$ are combined, the authentication accuracy is improved.

The reliability $V_i$ of a region is different from each other with respect to each person. Therefore, authentication accuracy is improved by updating the $V_i$ with use of an authentication result. In particular, the surface reflection degree $T_i$ is an index indicating quality of the region for the authentication process. Therefore, when the surface reflection degree $T_i$ is used for a speed of updating, the authentication accuracy is improved.

Modified Embodiment

In the above-mentioned embodiment, the surface reflection degree is not obtained during the enrollment process. However, the structure is not limited. For example, the surface reflection degree may be obtained during the enrollment process, and the surface reflection degree may be related to an enrollment feature data. The surface reflection degree obtained during the enrollment process may be used as the surface reflection degree $T_i'$ corresponding to each small region $B_i$. The enrollment process unit 70 may include the surface reflection degree $T_i'$ in the enrollment data. A description will be given of an enrollment process in this case.

FIG. 9A illustrates an example of a flowchart executed during the enrollment process of the modified embodiment. A description will be given of the example of the enrollment process of the modified embodiment with reference to FIG. 9A. First, the imaging unit 20 obtains a palm image $I_R$ taken by the biometric sensor 104 (Step S31). Next, the imaging unit 20 detects a palm region from the palm image $I_R$ obtained by the biometric sensor 104. Next, the imaging unit 20 extracts a feature data $F_R$ from the palm region (Step S32). Next, the imaging unit 20 obtains a feature data $F_{Ri}$ corresponding to small regions Bi obtained by dividing the detected palm region (Step S33).

Next, the surface reflection degree obtain unit 50 calculates a surface reflection degree $T_i'$ with respect to each small region $B_i$ in the palm image $I_R$ (Step S34). Next, the enrollment process unit 70 relates the feature data $F_{Ri}$ and the surface reflection degree $T_i'$ to the small region $B_i$ and enrolls the small region $B_i$, the feature data $F_{Ri}$ and the surface reflection degree $T_i'$ in the enrollment database 80 as an enrollment data (Step S35). FIG. 9B illustrates an example of the enrollment data. After the Step S35, the flowchart of FIG. 9A is terminated. In the modified embodiment, the reliability $V_i$ is not set during the enrollment process. Therefore, a similarity of a first authentication process may be used as the reliability. In the modified embodiment, the reliability $V_i$ may be set and included in the enrollment data during the enrollment process.

When the surface reflection degree $T_i'$ is included in the enrollment data, the authentication process unit 60 may correct the similarity $S_i$ with use of the surface reflection degree $T_i'$, the reliability $V_i$ and the surface reflection degree $T_i$. For example, the authentication process unit 60 may calculate the similarity $S_i'$ by correcting the similarity $S_i$ in accordance with the following formula (8). When the formula (8) is used, the lower the reliability is, the lower the similarity is. The higher the surface reflection degree is, the lower the similarity is. The higher the reliability is, the higher the similarity is. The lower the surface reflection degree is, the higher the similarity is.

[Formula 8]

$$S'_i = S_i \cdot (1.0 - T'_i) \cdot (1.0 - T_i) \cdot V_i \quad (8)$$

In the above-mentioned embodiments, the biometric sensor during the enrollment process is identical with the biometric sensor during the authentication process. However, the biometric sensors may be different from each other. For example, a sensor of a mobile type terminal such as a note PC is used for a comparison-use sensor. A fixed high-precision sensor may be used as an enrollment-use sensor. In this case, a technology for reducing surface reflection may be applied to the enrollment-use sensor. In this case, the influence of the surface reflection in an enrollment-use biometric image is suppressed. Therefore, even if the surface reflection degree is not included in the enrollment data, high accuracy authentication can be achieved.

The above-mentioned embodiments are applied to one-to-N authentication. However, the above-mentioned embodiments may be applied to one-to-one authentication. The one-to-N authentication is an authentication method in which a genuine user is determined from N enrolled users. The one-to-one authentication is an authentication method in which an authentication is performed after identifying a user with use of an ID card or the like in advance. Therefore, the one-to-one authentication is an authentication in which it is determined whether a single enrolled user coincides with a user to be authenticated.

In the above-mentioned embodiments, a palm is used as a subject. However, another subject image such as a finger may be taken, and a vein pattern under a skin of the subject may be extracted as biometric information. In the above-mentioned embodiments, the vein pattern is used as a biometric body. However, the above-mentioned embodiments may be applied to a biometric body on which surface reflection component appears as a noise. For example, a face, an iris or the like may be used as biometric information.

In the above-mentioned embodiments, a biometric region is divided into a plurality of small regions. However, the above-mentioned embodiments may be applied to an authentication process of a single region.

A storage medium storing a program of a software for realizing the functions of the biometric authentication device 100 may be supplied to the biometric authentication device 100, and the CPU 101 may execute the program. The storage medium for supplying the program is a CD-ROM, a DVD, a Blu-ray, an SD card or the like. In the above-mentioned embodiments, each function is realized when the CPU executes the program. However, a dedicated circuit or the like may realize each function.

Preferred embodiments of the present invention have been described in detail. The present invention is not limited to the specific embodiments but may be varied or changed within the scope of the claimed invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A biometric authentication device comprising:
    a memory configured to store an enrollment feature data;
    a biometric sensor that obtains a biometric image of a user; and
    a circuitry configured to:
    obtain a surface reflection degree of the biometric image;
    extract a comparison-use feature data from the biometric image; and
    perform a comparing based on a similarity between the comparison-use feature data and the enrollment feature data, the similarity being obtained by using a correction coefficient and the surface reflection degree related to a region of the biometric image, the correction coefficient being a weighting coefficient of the similarity.

2. The biometric authentication device as claimed in claim 1, wherein the circuitry is configured to obtain a similarity with respect to each of regions of the biometric image.

3. The biometric authentication device as claimed in claim 1, wherein the circuitry is configured to update the correction coefficient based on an authentication result.

4. The biometric authentication device as claimed in claim 3, wherein the circuitry is configured to use the surface reflection degree as a weight for updating the correction coefficient.

5. The biometric authentication device as claimed in claim 1 wherein:
    the memory is configured to store a surface reflection degree of a basic biometric image for the enrollment feature data; and
    the circuitry is configured to reflect the stored surface reflection degree to the similarity between the enrollment feature data and the comparison-use feature data.

6. The biometric authentication device as claimed in claim 1, wherein the circuitry is configured to obtain a surface reflection degree based on a luminance value and a high frequency component of the biometric image.

7. The biometric authentication device as claimed in claim 1, wherein the circuitry is configured to obtain a surface reflection degree by a fitting process with respect to a luminance value of the biometric image.

8. A biometric authentication method comprising:
    obtaining a surface reflection degree of a biometric image obtained by a biometric sensor;
    extracting a comparison-use feature data from the biometric image; and
    obtaining a similarity between the comparison-use feature data and an enrollment feature data by using a correction coefficient and the surface reflection degree related to a region of the biometric image when performing a comparing based on the similarity, the correction coefficient being a weighting coefficient of the similarity.

9. A computer readable, non-transitory medium storing a program that causes a computer to execute a process, the process comprising:
    obtaining a surface reflection degree of a biometric image obtained by a biometric sensor;
    extracting a comparison-use feature data from the biometric image; and
    obtaining a similarity between the comparison-use feature data and an enrollment feature data by using a correction coefficient and the surface reflection degree related to a region of the biometric image when performing a comparing based on the similarity, the correction coefficient being a weighting coefficient of the similarity.

* * * * *